United States Patent [19]
Hasegawa et al.

[11] 3,901,996

[45] Aug. 26, 1975

[54] PROCESS FOR PREPARING A CHALCOGENIDE GLASS HAVING SILICON CONTAINING LAYER AND PRODUCT

[75] Inventors: Yasushi Hasegawa; Hideo Tagai, both of Sakura-Mura, Japan

[73] Assignee: National Institute for Researches in Inorganic Materials, Ibaraki, Japan

[22] Filed: Oct. 2, 1973

[21] Appl. No.: 402,797

[30] Foreign Application Priority Data
Oct. 11, 1972 Japan.............................. 47-10171
Apr. 10, 1973 Japan.............................. 48-41152

[52] U.S. Cl. ...................... 428/426; 65/3; 65/30; 65/374; 65/DIG. 15; 427/399; 427/401
[51] Int. Cl. ...................... B32b 17/06; C03c 17/00
[58] Field of Search ............. 65/30, 32, DIG. 15, 2, 65/374, 3, 60; 117/121, 119, 169 A; 106/50, 47 R, 70; 161/192

[56] References Cited
UNITED STATES PATENTS

| 3,209,641 | 10/1965 | Upton ............................ 65/DIG. 15 |
| 3,259,468 | 7/1966 | Stevens ........................... 65/33 X |
| 3,451,794 | 6/1969 | Patterson ......................... 65/32 X |
| 3,657,006 | 4/1972 | Fisher et al. ................... 65/DIG. 15 |

*Primary Examiner*—Robert L. Lindsay, Jr.
*Attorney, Agent, or Firm*—Oblon, Fisher, Spivak, McClelland & Maier

[57] ABSTRACT

A chalcogenide glass is prepared by melting a mixture of arsenic and a chalcogen of sulfur or selenium, contacting the molten chalcogenide glass with a silica glass surface in the absence of oxygen and solidifying the molten chalcogenide glass by cooling so as to form a glass with a silicon-containing layer. The molten chalcogenide glass is drawn through a silica glass nozzle heated under an inert atmosphere at a temperature the same or greater than the temperature of the molten chalcogenide glass with a force to maintain a suitable tensile strength on the extruded glass.

6 Claims, No Drawings

PROCESS FOR PREPARING A CHALCOGENIDE GLASS HAVING SILICON CONTAINING LAYER AND PRODUCT

BACKGROUND OF THE INVENTION

1. Field of the Invention

This invention relates to a chalcogenide glass having a silicon-containing layer and a process for preparing the same.

2. Description of the Prior Art

Heretofore, processes have been known for producing chalcogenide glass by eutectically melting a mixture of arsenic and a chalcogen such as sulfur or selenium. It has been particularly desirable to form a silicon-containing layer on the chalcogenide glass to promote the use of the chalcogenide glass in optical and electrical applications. Of particular importance has been the use of such chalcogenide glass in the transmission of infrared radiation.

SUMMARY OF THE INVENTION

Accordingly, one object of this invention is to provide a process for preparing a chalcogenide glass having a silicon-containing layer which has improved optical or electrical characteristics.

Another object of this invention is to provide a process for preparing a chalcogenide glass fiber having a silicon-containing layer which can be used as a transmitting path for infrared radiation.

Briefly, these objects and other objects of the invention as hereinafter will become more readily apparent can be attained by providing a process for preparing a chalcogenide glass having a silicon containing layer by eutectically melting a mixture of arsenic and a chalcogen of sulfur or selenium or a mixture of sulfur and selenium, contacting the molten chalcogenide glass material with a silica glass surface preferably under a nitrogen atmosphere which contains substantially no oxygen or under a vacuum and then cooling the molten glass to solidify it. Chalcogenide glass fibers having a silicon-containing layer can be prepared by drawing the molten glass with a force which exerts a suitable tensile strength through a nozzle having a portion thereof made of silica glass which is heated at a temperature the same or greater than the temperature of the molten chalcogenide glass under an inert atmosphere. When the fiber cools and solidifies, the chalcogenide glass has a silicon-containing layer which forms on the surface of the chalcogenide glass which contacts the silica glass.

DESCRIPTION OF THE PREFERRED EMBODIMENTS

The chalcogenide glass material used in the invention can be produced by charging arsenic and a chalcogen such as sulfur or selenium or a mixture of sulfur and selenium into a vessel which contains an atmosphere essentially free of oxygen by removing the air or substituting an atmosphere of nitrogen. The mixture is melted by heating the vessel in an electric furnace. The molten chalcogenide glass in then contacted with silica glass which has been heated to a temperature the same or higher than the temperature of the molten chalcogenide glass. The source of the silica glass can be the vessel into which the chalcogenide glass is placed or the nozzle through which the molten chalcogenide glass is drawn. If a transparent silica glass vessel is used, it is preferable to rock the vessel.

It is preferable to charge the high purity starting materials of a certain volume into a vessel under a reduced pressure of about $10^{-5}$ torr. The transparent silica glass vessel is then heat sealed. The silica glass vessel is horizontally inserted and secured in the tubular electric furnace which is rocked and heated at a predetermined rate. The rocking of the electric furnace is stopped after a uniform molten mixture is formed. The silica glass vessel containing the molten chalcogenide glass is stood in a vertical position so that the molten chalcogenide glass contacts the inner surface of the silica glass vessel as it stands quiescent. The molten chalcogenide glass is allowed to stand and thereby solidify upon cooling whereby the silicon containing layer is formed on the surface of the chalcogenide glass which contacts the silica glass.

It is preferable to use a chalcogen of sulfur or selenium of high purity. It is especially preferable to use a mixture of sulfur and selenium as the chalcogen component. Moreover, it is possible to add other suitable components such as tellurium or germanium to the principle components of sulfur or selenium. It is preferable to combine arsenic of a high purity with the chalcogen component. If desired, antimony can be substituted for a small portion of the arsenic.

The glass of the invention is formed by combining from 15 – 50 atom % of arsenic or an arsenic-antimony combination with 85–50 atom % of sulfur, selenium or a combination of sulfur and selenium. It is possible to add 0 – 10 wt. % of tellurium, 0 – 10 wt. % of antimony and 0 – 5 wt. % of germanium to the glass composition.

The melting point of sulfur is 112.8°C and the melting point of selenium is 217°C. Furthermore, arsenic readily sublimes as shown by the following temperature and vapor pressure correlation.

| Temperature | Vapor pressure |
| --- | --- |
| 380°C | 1 mHg |
| 440°C | 10 mHg |
| 510°C | 100 mHg |
| 580°C | 400 mHg |
| 610°C | 760 mHg |

Thus in the preparation of the glass it is preferable to melt the starting materials of the chalcogenide glass at 500°– 800°C from the viewpoint of the reaction of the starting materials and the durability of the vessel. The internal atmosphere of the vessel can be nitrogen gas or some other inert gas atmosphere or a vacuum. The melt mixing of the starting materials of the chalcogenide glass can be conducted in a suitable furnace. Contact of the molten chalcogenide glass with the silica glass can be achieved by dipping a silica glass plate into the molten glass. Preferably, a silica glass with a purity greater than 99.98% is used. The silica glass can be a natural crystallized quartz which contains the following impurities.

| | | | |
| --- | --- | --- | --- |
| $Fe_2O_3$ | 7 ppm | $TiO_2$ | 9 ppm |
| $Al_2O_3$ | 47 ppm | $CaO$ | 17 ppm |
| $MgO$ | 0 ppm | $K_2O$ | 4 ppm |
| $Na_2O$ | 4 ppm | $Li_2O$ | 1 ppm |

When the molten chalcogenide glass is contacted with the silica glass with the vessel at rest, the contact time of the chalcogenide glass with the silica glass depends upon the silicon-containing layer required and the temperature. The content of silica in the silicon-containing layer increases depending upon the time and temperature. When the chalcogenide glass is heated in a sealed silica glass tube, visible crystals of arsenous oxide are found on the wall of the silica glass tube after cooling. These crystals do not form when no heat treatment is performed. It is believed crystals of arsenous oxide form when a silicon-containing layer forms on the surface of the molten chalcogenide glass by the reaction between the silica glass surface and the chalcogenide glass surface.

In the process of the invention, the molten chalcogenide glass solidifies in a suitable shaped silica glass vessel when the vessel is allowed to cool at rest. The molten chalcogenide glass can also solidify in any suitably shaped vessel (made of some other material) by contacting the cooling glass with a silica glass plate. The molten chalcogenide glass can be solidified by rapid cooling so as to avoid turbulence of the glass.

The novel chalcogenide glass of the invention has a silicon-containing layer which contains a relatively high content of silica. For example, the silicon-containing layer can be modified by oxidation of the surface area, so as to provide a glass having effective characteristics for use in optical and electrical applications. In order to prepare a chalcogenide glass fiber having a silicon-containing layer, the molten chalcogenide glass is extruded and drawn through a nozzle made of a silica glass tube or the like under an inert atmosphere. The following is an example of the preparation of a silicon layer containing chalcogenide glass fiber. The chalcogenide glass is prepared by melting the starting materials at 300° – 400°C for 3 hours and at 650° – 750°C for 10 – 14 hours in a slowly rocking electric furnace (30°, one cycle per minute) to form a uniform molten chalcogenide glass.

Molten chalcogenide glass fibers having a diameter of from several microns to 20 – 40 microns can be prepared by the method of manufacture of silica glass fibers. In one procedure, a vessel purged with an inert gas such as nitrogen is equipped with a silica glass nozzle having a diameter of 0.8 – 2.0 mm, a thickness of about 1 mm and a length of 10 – 15 mm. A 10 – 20 g amount of the chalcogenide glass is charged into the vessel and is heated at a temperature greater than the softening point of the chalcogenide glass. The viscosity at the softening point is $10^{7.5} - 10^8$ poise. Preferably the chalcogenide glass is heated until a viscosity of $10^{7.5} - 10^8$ poise is attained. For example, the $As_2S_3$ glass had a viscosity of $10^{7.5} - 10^8$ poise at about 220°C. Accordingly, it is preferable to keep the temperature at 220° – 350°C. When the temperature of the glass is maintained in that region, the chalcogenide glass has fluidity and flows down through the nozzle. The end of the chalcogenide glass which extrudes through the nozzle is drawn. The temperature conditions, the take-up velocity of the fiber and the amount of heat in the space between the nozzle and the glass portion drawn are determined by the experimental conditions. When a chalcogenide glass is extruded through a silica glass nozzle having a diameter of 1 – 2 mm and al length of 30 mm and is drawn at a rate of 1 – 2 m/sec., the temperature of chalcogenide ($As_2S_3$) glass is 330°C and the temperature of the silica glass nozzle is at 350°C. The temperature of the space under the nozzle (about 50 mm) is 300°C, and a chalcogenide glass fiber of about 20 – 10$\mu$ in diameter and a length of 20 – 40 centimeters is obtained. If the temperature of the chalcogenide glass decreases slightly and the drawing velocity decreases to less than 1 m/sec., then a fiber having a diameter of about 50$\mu$ is obtained. Electron microprobe analysis of the resulting chalcogenide glass fiber which has a diameter of 50$\mu$ shows that the silicon-containing layer has a thickness of 20 – 40 to 100 A.

The silica glass nozzle used in the vessel in the process of the invention is preferably a long one which is tapered to a narrow outer end. In order that the molten chalcogenide glass flow smoothly from the nozzle, it is preferable to control the temperature of the nozzle so that the temperature of the silica glass nozzle is greater than that of the chalcogenide glass. The chalcogenide glass fiber can be continuously taken up by a winding reel. It is also possible to extrude a plurality of filaments from a spinneret. The chalcogenide glass made of arsenic and a chalcogen of sulfur or selenium has special infrared optical characteristics which are shown in Table I.

The silicon-containing layer formed on the surface of the chalcogenide glass fiber can be controlled by the extrusion and drawing conditions. After the fiber is formed, the silicon in the silicon containing layer can be converted in an oxidizing atmosphere to SiO and then to $SiO_2$. The refractive indices of the chalcogenide glass and the Si, SiO and $SiO_2$ layers are respectively, 2.4 – 2.8, 3.5, 1.5 – 1.9 and 1.5. Accordingly, a means is readily provided for altering the refractive index of the surface of the silicon-containing layer by selecting the appropriate atmosphere to achieve a Si, SiO or $SiO_2$ containing glass. If the surface of the chalcogenide glass fiber is converted from Si to $SiO_2$, the refractive index can be changed from 3.5 to 1.5. Thus, the chalcogenide glass fiber having a silicon-containing layer is useful as a light wave guide path because very little light is lost. If the surface of the chalcogenide glass fiber is treated, with, for example, a metal such as aluminum, gold, silver, copper, or platinum; a metallic oxide such as alumina, berylia or titania; magnesium fluoride; zinc sulfide; or the like, loss of light can be further decreased. The chalcogenide glass fiber can be metallized by a vapor metallizing method or a chemical plating method to form a light transmitting path which minimizes the loss of light. Although the reason for this is not clear, the silicon-containing layer facilitates the surface processing of the fiber by the vapor metallizing method or the chemical plating method. Table I shows the infrared optical characteristics of chalcogenide glass.

TABLE I

| Type of Glass | Transmission region | Average refractive index |
|---|---|---|
| $As_{40}S_{60}$ | 0.7 – 8$\mu$ | 2.4 |
| $As_{40}Se_{60}$ | 0.9 – 12$\mu$ | 2.8 |

Having described the invention, a further understanding can be obtained by certain specific examples which are provided herein for purposes of illustration only and are not intended to be limiting in any manner.

EXAMPLE 1

A 9.38 g amount of high purity arsenic (99.9999%) and 5.62 g of high purity sulfur (99.9999%) were charged into a transparent silica glass tube having a diameter of 10 mm and a thickness of 1 mm. The tube was heat sealed under a reduced pressure of $10^{-5}$ torr and was heated at 300° – 400°C for 3 – 4 hours and at 650° – 750°C for 10 hours in an electric furnace which was disposed in a horizontal position. The furnace was rocked over a 30° arc at a rate of one cycle per minute, whereby a chalcogenide glass was formed. The electric furnace containing the tube was turned to a vertical position for the solidification step. The molten chalcogenide glass was contacted with a silica glass tube at 700°C for 1 hour, and the contents of the tube were solidified by cooling. The resulting chalcogenide glass had a formula of 40 atom % arsenic (62.2 wt. %) and 60 atom % sulfur (37.8 wt. %). Elementary analysis of the glass as measured by an electron microprobe analyzer showed the formation of a silicon-containing layer having a thickness of about $4\mu$ on the surface of the glass which contacted the silica glass tube. The content of oxygen in the layer was the same as that of the core. There was no essential difference between the two. Crystals precipitated on the walls of the silica glass tube and were identified as arsenous oxide by X-ray diffraction.

EXAMPLE 2

A 9.97 g amount of high purity arsenic (99.9999%) and 15.02 g of high purity selenium (99.9999%) were melted in accordance with the procedure of Example 1 to form a chalcogenide glass having a composition of 40 atom % arsenic (39.9 wt. %) and 60 atom % selenium (60.1 wt. %). The formation of a silicon containing layer having a thickness of $3 - 4\mu$ was found on the surface of the glass which contacted the silica glass tube. The oxygen content of the layer was the same as that of the glass of the core. Despite the fact the molten chalcogenide glass was allowed to solidify without maintaining the furnace in a stable position, the silicon content of the glass was uniform. No difference in the silicon content of the layers was detected.

EXAMPLE 3

A chalcogenide glass was formed by heating 40 atom % arsenic, 30 atom % sulfur and 30 atom % selenium, in accordance with the procedure of Example 1. Another chalcogenide glass was formed by heating 40 atom % arsenic, 30 atom % sulfur, 15 atom % selenium and 5 atom % tellurium by the procedure of Example 1 in a separate operation. Each of the glasses was found to contain a silicon containing layer of $3 - 4\mu$ thickness on the surfaces which contacted the silica glass tubes.

EXAMPLE 4

An 11.24 g amount of high purity sulfur (99.9999%) and 18.76 g of high purity arsenic (99.9999%) were charged into a transparent silica glass tube. The tube containing a void space was sealed under a pressure of $10^{-5}$ torr, and then was heated at 400°C for 3 hours and at 700°C for 13 hours in an electric furnace which was held in a horizontal position. The furnace was rocked over a 30° arc in one cycle per minute. Upon cooling, the molten chalcogenide glass solidified to form a chalcogenide glass having a composition of 40 atom % arsenic and 60 atom % sulfur ($As_{40}S_{60}$). A 10 g amount of the chalcogenide glass was melted again in a silica glass spinneret having an inner diameter of 10 mm, a thickness of 1.0 mm and a length of 100 mm. The spinneret was equipped with a silica glass nozzle having an inner diameter of 1 mm, a length of 20 mm and a thickness of 1 mm. The spinneret was placed onto an electric furnace which contained a vessel under a nitrogen atmosphere. The chalcogenide glass was heated at 350°C and extruded from the end of the nozzle.

The chalcogenide glass fiber was maintained under a nitrogen atmosphere in the following treatment so as to obtain a suitable chalcogenide glass fiber having a predetermined diameter. An auxiliary heater containing a coiled ribbon heating element was placed over the nozzle to heat the silica glass nozzle to a temperature of 370°C. The temperature of the space outside of the nozzle was maintained at 300° – 350°C. When the drawing velocity was 0.5 m/sec.; 1 – 2 m/sec.; and 3 – 5 m/sec., chalcogenide glass fibers having diameters of about $50\mu$, $20\mu$ and $10\mu$ were obtained respectively. Auger electron spectrophotography of the $50\mu$ diameter chalcogenide glass fiber showed that the fiber had a silicon containing layer with a thickness ranging from 50 to 100 A.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing a chalcogenide glass having a silicon-containing layer, which comprises melting a mixture of arsenic and a chalcogen of sulfur or selenium; contacting the molten chalcogenide glass with a silica glass surface in an atmosphere essentially free of oxygen whereby the silica glass surface reacts with said molten chalogenide glass to deposit a film of silica metal thereon; and solidifying said molten chalcogenide glass by cooling.

2. The process of claim 1, wherein said molten chalcogenide glass is extruded from a nozzle made of silica glass which acts as a source of silica to form a chalcogenide glass fiber having a silicon-containing layer.

3. The process of claim 1, wherein the molten chalcogenide glass is contacted with the silica glass which is at a temperature greater than that of the chalcogenide glass.

4. The process of claim 1, wherein said mixture contains 15 – 50 atom % arsenic or a mixture of arsenic and antimony, and 85 – 50 atom % sulfur, selenium or a mixture of sulfur and selenium.

5. The process of claim 4, wherein 0 – 10 wt. % tellurium or 0 – 5 wt. % germanium is added to the mixture.

6. The chalcogenide glass of claim 1.

* * * * *